(12) United States Patent
Bullerjahn et al.

(10) Patent No.: US 9,212,091 B2
(45) Date of Patent: *Dec. 15, 2015

(54) METHOD AND ADDITIVE FOR INCREASING EARLY STRENGTH

(75) Inventors: Frank Bullerjahn, Leimen (DE); Dirk Schmitt, Leimen (DE); Mohsen Ben Haha, Heidelberg (DE)

(73) Assignee: HEIDELBERGCEMENT AG, Heidelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/238,976

(22) PCT Filed: Jul. 16, 2012

(86) PCT No.: PCT/EP2012/002977
§ 371 (c)(1),
(2), (4) Date: Mar. 21, 2014

(87) PCT Pub. No.: WO2013/023730
PCT Pub. Date: Feb. 21, 2013

(65) Prior Publication Data
US 2014/0238274 A1    Aug. 28, 2014

(30) Foreign Application Priority Data

Aug. 18, 2011 (EP) .................................. 11006757
Oct. 26, 2011 (EP) .................................. 11008570
Mar. 5, 2012 (EP) .................................. 12001488
Mar. 26, 2012 (EP) .................................. 12002111
Mar. 30, 2012 (EP) .................................. 12002342
May 10, 2012 (EP) .................................. 12003718

(51) Int. Cl.
| | |
|---|---|
| *C04B 28/04* | (2006.01) |
| *C04B 7/32* | (2006.01) |
| *C04B 28/08* | (2006.01) |
| *C04B 7/345* | (2006.01) |
| *C04B 28/06* | (2006.01) |
| *C04B 40/00* | (2006.01) |
| *C04B 28/02* | (2006.01) |
| *C04B 22/00* | (2006.01) |
| *C04B 22/14* | (2006.01) |
| *C04B 7/02* | (2006.01) |
| *C04B 7/26* | (2006.01) |
| *C04B 7/28* | (2006.01) |
| *C04B 16/04* | (2006.01) |
| *C04B 103/14* | (2006.01) |
| *C04B 111/00* | (2006.01) |

(52) U.S. Cl.
CPC ................ *C04B 7/3453* (2013.01); *C04B 7/02* (2013.01); *C04B 7/26* (2013.01); *C04B 7/28* (2013.01); *C04B 7/323* (2013.01); *C04B 7/326* (2013.01); *C04B 7/345* (2013.01); *C04B 16/04* (2013.01); *C04B 22/0093* (2013.01); *C04B 22/14* (2013.01); *C04B 28/02* (2013.01); *C04B 28/021* (2013.01); *C04B 28/04* (2013.01); *C04B 28/065* (2013.01); *C04B 28/08* (2013.01); *C04B 40/0039* (2013.01); *C04B 2103/14* (2013.01); *C04B 2111/00017* (2013.01); *C04B 2111/00767* (2013.01); *Y02W 30/91* (2015.05)

(58) Field of Classification Search
CPC .......... C04B 7/3453; C04B 7/02; C04B 7/26; C04B 7/28; C04B 7/345; C04B 7/326; C04B 7/323; C04B 14/106; C04B 14/303; C04B 16/04; C04B 22/06; C04B 22/10; C04B 22/14; C04B 22/085; C04B 22/0093; C04B 22/124; C04B 22/148; C04B 28/02; C04B 28/04; C04B 28/08; C04B 28/021; C04B 28/065; C04B 40/0039; C04B 2103/14; C04B 2111/00767; C04B 2111/00017
USPC ......................................... 106/643, 706, 789
See application file for complete search history.

(56) References Cited

U.S. PATENT DOCUMENTS

| | | | |
|---|---|---|---|
| 6,113,684 A | 9/2000 | Kunbargi | |
| 6,406,534 B1 * | 6/2002 | Kunbargi | ...................... 106/692 |
| 6,758,896 B2 * | 7/2004 | Kunbargi | ...................... 106/692 |
| 7,150,786 B2 * | 12/2006 | Kunbargi | ...................... 106/692 |
| 8,153,552 B2 | 4/2012 | Cau Dit Coumes et al. | |
| 8,557,039 B2 | 10/2013 | Jacob et al. | |

(Continued)

FOREIGN PATENT DOCUMENTS

| | | |
|---|---|---|
| AT | 393 381 B | 10/1991 |
| CN | 1479700 A | 3/2004 |

(Continued)

OTHER PUBLICATIONS

Belz et al., "Synthesis of Special Cements from Mixtures Containing Fluidized Bed Combustion Waste, Calcium Carbonate and Various Sources of Alumina", 28th Meeting of the Italian Section of The Combustion Institute (2005), pp. I-4-1-I-4-6.

(Continued)

*Primary Examiner* — Anthony J Green
(74) *Attorney, Agent, or Firm* — Paul D. Strain, Esq.; Strain & Strain PLLC

(57) ABSTRACT

The present invention relates to a method for accelerating the hardening of hydraulic or latent hydraulic binders, wherein ternesite and an aluminum component are added to the binder, and relates to an additive that increasing early strength for hydraulic or latent hydraulic binders that contain ternesite and a non-hydraulically reactive aluminum component, and relates to the use of an additive comprising ternesite and an aluminum component for the purpose of accelerating the hardening of hydraulic or latent hydraulic binders.

23 Claims, 3 Drawing Sheets

(56) References Cited

U.S. PATENT DOCUMENTS

| | | | |
|---|---|---|---|
| 8,574,359 | B2 | 11/2013 | Marchi et al. |
| 2002/0164485 | A1 | 11/2002 | Martin |
| 2004/0101672 | A1 | 5/2004 | Anton et al. |
| 2011/0308431 | A1 | 12/2011 | Pasquier et al. |
| 2012/0085265 | A1 | 4/2012 | Walenta et al. |
| 2013/0118384 | A1 | 5/2013 | Barnes-Davin et al. |
| 2014/0230696 | A1 | 8/2014 | Bullerjahn et al. |
| 2014/0230697 | A1 | 8/2014 | Bullerjahn et al. |
| 2014/0230699 | A1 | 8/2014 | Bullerjahn et al. |
| 2014/0261088 | A1 | 9/2014 | Bullerjhan et al. |
| 2014/0283712 | A1 | 9/2014 | Bullerjahn et al. |

FOREIGN PATENT DOCUMENTS

| | | |
|---|---|---|
| CN | 101952216 A | 1/2011 |
| DE | 21 22 710 A1 | 11/1971 |
| DE | 37 01 717 C1 | 4/1988 |
| DE | 196 44 654 A1 | 4/1998 |
| DE | 198 43 092 A1 | 11/1999 |
| DE | 600 29 770 T2 | 8/2007 |
| DE | 10 2005 054 190 B3 | 10/2007 |
| EP | 0 397 963 A1 | 11/1990 |
| EP | 0 838 443 A1 | 4/1998 |
| EP | 0 858 981 A1 | 8/1998 |
| EP | 0 959 053 A1 | 11/1999 |
| EP | 1 171 398 B1 | 8/2006 |
| EP | 2 159 202 A1 | 3/2010 |
| EP | 2 559 674 A1 | 2/2013 |
| FR | 2 901 270 A1 | 11/2007 |
| FR | 2 928 643 A1 | 9/2009 |
| FR | 2 946 978 A1 | 12/2010 |
| JP | 9-268037 A | 10/1997 |
| JP | 2001-130945 A | 5/2001 |
| WO | WO 98/18740 A1 | 5/1998 |
| WO | WO 2005/097700 A2 | 10/2005 |
| WO | WO 2012/055517 A1 | 5/2012 |
| WO | WO 2013/023727 A2 | 2/2013 |
| WO | WO 2013/023728 | 2/2013 |
| WO | WO 2013/023729 A2 | 2/2013 |
| WO | WO 2013/023731 A2 | 2/2013 |
| WO | WO 2013/023732 A2 | 2/2013 |

OTHER PUBLICATIONS

Belz et al., "Fluidized Bed Combustion Waste as a Raw Mix Component for the Manufacture of Calcium Sulphoaluminate Cements", 29th Meeting of the Italian Section of The Combustion Institute (2006), pp. IX4.1-IX4.5.
English translation of International Preliminary Report on Patentability, PCT/EP2012/002974, Feb. 20, 2014.
English translation of International Preliminary Report on Patentability, PCT/EP2012/002975, Feb. 20, 2014.
English translation of International Preliminary Report on Patentability, PCT/EP2012/002976, Feb. 20, 2014.
English translation of International Preliminary Report on Patentability, PCT/EP2012/002977, Feb. 27, 2014.
English translation of International Preliminary Report on Patentability, PCT/EP2012/002978, Feb. 20, 2014.
English translation of International Preliminary Report on Patentability, PCT/EP2012/002979, Feb. 27, 2014.
Jewell et al., "The Fabrication of Value Added Cement Products from Circulating Fluidized Bed Combustion Ash", 2007 World of Coal Ash (WOCA), May 7-10, 2007, Northern Kentucky, USA, 11 pgs.
Kapralik et al., "Phase Changes in the System CaO-Al2O3-SiO2-Fe2O3-MgO-CaSO4-K2SO4 in Ar up to 1300 °C referred to Sulphoaluminate Cement Clinker", Br. Ceram. Trans. J., vol. 85 (1986), pp. 131-136.
Sahu et al., "Phase compatibility in the system CaO-SiO2-Al2O3-Fe2O3-SO3 referred to sulphoaluminate belite cement clinker", Cement and Concrete Research, vol. 23 (1993), pp. 1331-1339.
Bullerjahn, U.S. PTO Office Action, U.S. Appl. No. 14/239,319, Jun. 26, 2014, 18 pgs.
Bullerjahn, U.S. PTO Office Action, U.S. Appl. No. 14/239,339, Jun. 27, 2014, 16 pgs.
Beretka et al. "Synthesis and Properties of Low Energy Cements based on C4A3S", 9th International Congress on the Chemistry of Cement (1992), pp. 195-200.
Beretka et al., "Utilisation of industrial wastes and by-products for the synthesis of special cements", Resources, Conservation and Recycling, vol. 9 (1993), pp. 179-190.
Bullerjahn, U.S. PTO Office Action, U.S. Appl. No. 14/238,872, Jul. 21, 2014, 14 pgs.
Bullerjahn, U.S. PTO Office Action, U.S. Appl. No. 14/239,348, Jun. 30, 2014, 15 pgs.
Calos et al., Structure of Calcium Aluminate Sulfate Ca4Al6O16S, Journal of Solid State Chemistry, vol. 119 (1995), pp. 1-7.
Schmidt et al. "Quantification of Calcium Sulpho-Aluminate Cement by Rietveld Analysis", Materials Science Forum, vols. 321-324 (2000), pp. 1022-1027.
Bullerjahn, U.S. PTO Notice of Allowance, U.S. Appl. No. 14/239,319, Dec. 29, 2014, 13 pgs.
Bullerjahn, U.S. PTO Notice of Allowance, U.S. Appl. No. 14/239,339, Jan. 12, 2015, 13 pgs.
Bullerjahn, U.S. PTO Notice of Allowance, U.S. Appl. No. 14/239,348, Jan. 5, 2015, 11 pgs.
Bullerjahn, U.S. PTO Notice of Allowance, U.S. Appl. No. 14/238,872, Dec. 16, 2014, 14 pgs.
Belz et al., "Use of Fly Ash, Blast Furnace Slag, and Chemical Gysum for the Synthesis of Calcium Sulfoaluminate-Based Cements", Fly Ash, Silica Fume, Slag and Natural Pozzolans in Concrete. Proceedings International Conference, vol. 1, No. SP-153 (1995), pp. 513-530, XP001011491.
Beretka et al,. "The Influence of $C_4A_3S$ Content and W/S Ratio on the Performance of Calcium Sulfoaluminate-based Cements", Cement and Concrete Research, vol. 26, No. 11 (1996), pp. 1673-1681.
European Search Report, Appl. No. 11006757.6, Jan. 25, 2012, 9 pgs.
European Search Report, Appl. No. 12001488.1, Jun. 27, 2012, 13 pgs.
European Search Report, Appl. No. 12002111.8, Jun. 27, 2012, 15 pgs.
European Search Report, Appl. No. 12002342.9, Jul. 25, 2012, 13 pgs.
European Search Report, Appl. No. 12003718.9, Oct. 11, 2012, 14 pgs.
International Search Report, PCT/EP2012/002974, Feb. 8, 2013, 3 pgs.
International Search Report, PCT/EP2012/002975, Feb. 8, 2013, 4 pgs.
International Search Report, PCT/EP2012/002976, Feb. 8, 2013, 4 pgs.
International Search Report, PCT/EP2012/002977, Feb. 8, 2013, 3 pgs.
International Search Report, PCT/EP2012/002978, Feb. 8, 2013, 2 pgs.
International Search Report, PCT/EP2012/002979, Feb. 8, 2013, 4 pgs.
Irran et al., "Ternesit, $Ca_5(SiO_4)_2SO_4$, a new Mineral from the Ettringer Bellerberg/Eifel, Germany", Mineralogy and Petrology, vol. 60, No. 1-2 (1997), pp. 121-132.
Kurdowski et al., "Mineral Composition of Build-Up in Cement KILN Preheater", Journal of Thermal Analysis and Calorimetry, vol. 55 (1999), pp. 1021-1029.
Marroccoli et al., "'Synthesis of Calcium Sulfoaluminate Cements From $Al_2O_3$—Rich By-products From Aluminium Manufacture", $2^{nd}$ International Conference on Sustainable Construction Materials and Technologies $28^{th}$-$30^{th}$ Jun. 2010, University Politecnica Delle Marche, Ancona, Italy, No. 2 (2010), pp. 1-9, XP002645670.
Sherman et al., "Long-term behaviour of hydraulic binders based on calcium sulfoaluminate and calcium sulfosilicate", Cement & Concrete Research, vol. 25, No. 1 (1995), pp. 113-126.
Stark, "Zernent and Kalk: Der Baustoff als Werkstoff", Jan. 1, 2000. Birkhauser. Basel, XP002679558, ISBN: 3-7643-6216-2, p. 61.
Japanese Office Action, Application No. 2014-525336, Mar. 3, 2015, 4 pgs.

(56) References Cited

OTHER PUBLICATIONS

Odler, Special Inorganic Cements:, (2000), pp. 65, 66, 78, ISBN: 0-419-22790-3, https://books.google.co.jpbooks?id=p6YTKgk8mBgC&pg=PA66&dg=C4A3&f=false.

Makhmudova et al., "Synthesis and Properties of Sulphoferrite Calcium Clinkers and Low Temperature Cements on their Basis", Journal of the University of Chemical Technology and Metallurgy, vol. 46, No. 2 (2011), pp. 151-154.

"CaO-Al2O3-SO3-SiO2", P051045:10946, Mar. 11, 2015, pp. 95-98.

Li et al., "Microwave sintering of sulphoaluminate cement with utility wastes", Cement and Concrete Research, vol. 31, No. 9 (2001), pp. 1257-1261.

Bullerjahn, U.S. PTO Notice of Allowance, U.S. Appl. No. 14/238,872, May 8, 2015, 12 pgs.

Bullerjahn, U.S. PTO Notice of Allowance, U.S. Appl. No. 14/239,319, May 8, 2015, 11 pgs.

Bullerjahn, U.S. PTO Notice of Allowance, U.S. Appl. No. 14/239,339, May 8, 2015, 12 pgs.

Bullerjahn, U.S. PTO Notice of Allowance, U.S. Appl. No. 14/239,348, May 12, 2015, 11 pgs.

Bullerjahn, U.S. PTO Office Action, U.S. Appl. No. 14/238,947, Mar. 25, 2015, 21 pgs.

Chinese Office Action and English translation thereof, Appl. No. 201280040095.9, Mar. 19, 2015, 16 pgs.

Chinese Office Action and English translation thereof, Appl. No. 201280040099.7, Feb. 13, 2015, 21 pgs.

Chinese Search Report and English translation thereof, Appl. No. 201280040006.0, Apr. 28, 2015, 4 pgs.

Bullerjahn, U.S. PTO Office Action, U.S. Appl. No. 14/238,947, Aug. 6, 2015, 9 pgs.

Bullerjahn, U.S. PTO Notice of Allowance, U.S. Appl. No. 14/238,947, Oct. 26, 2015, 8 pgs.

\* cited by examiner

Figure 1, Weight loss (chem. bonded water) after 7d
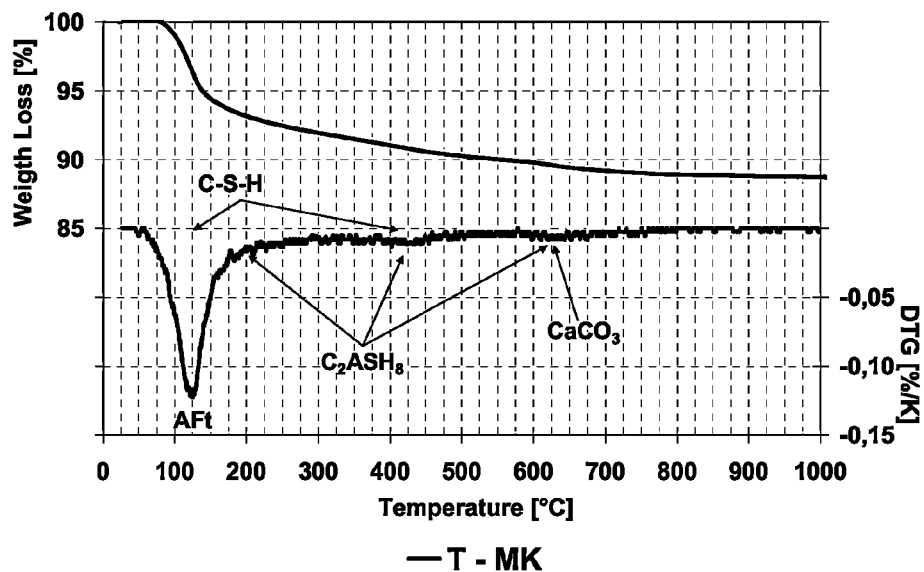
Figure 2, Weight loss (chem. bonded water) after 7d
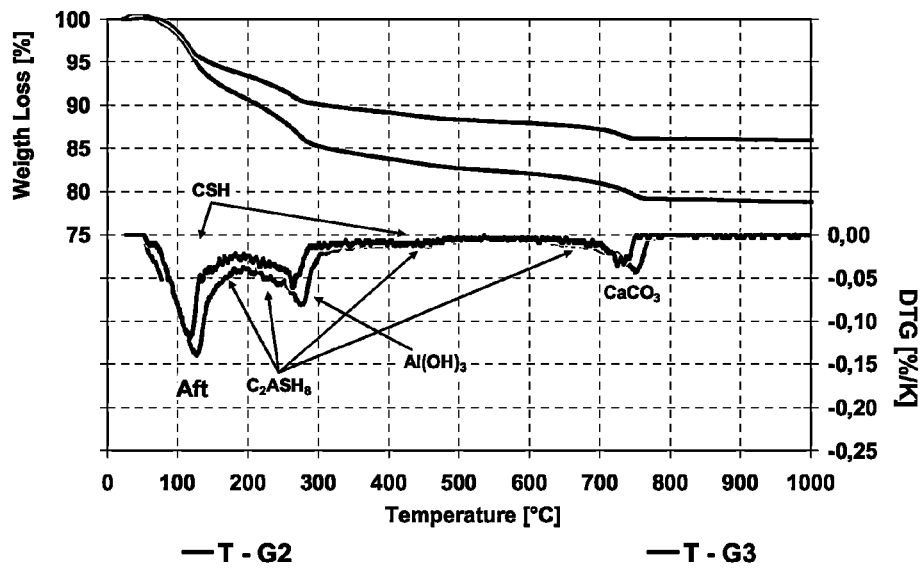

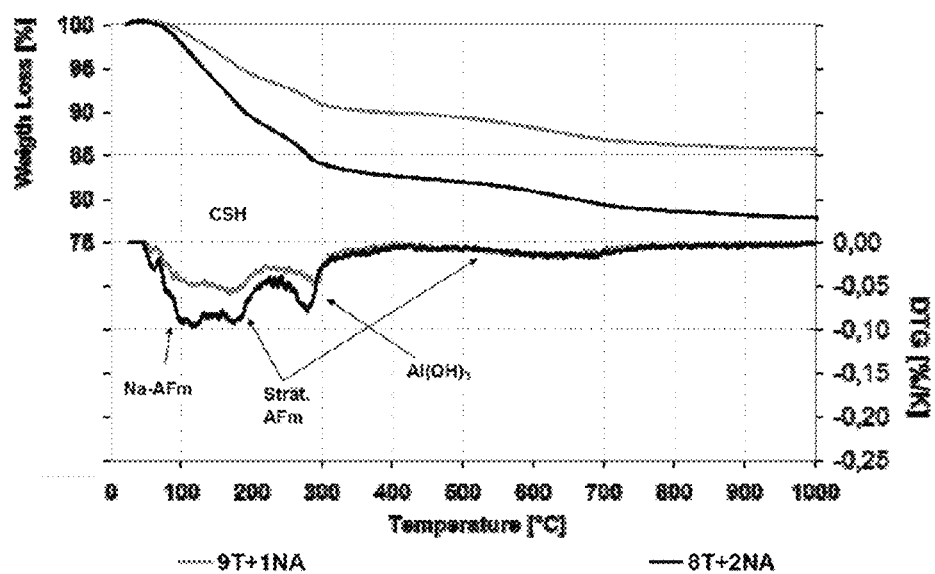
Figure 3, Weight loss (chem. bonded water) after 7d

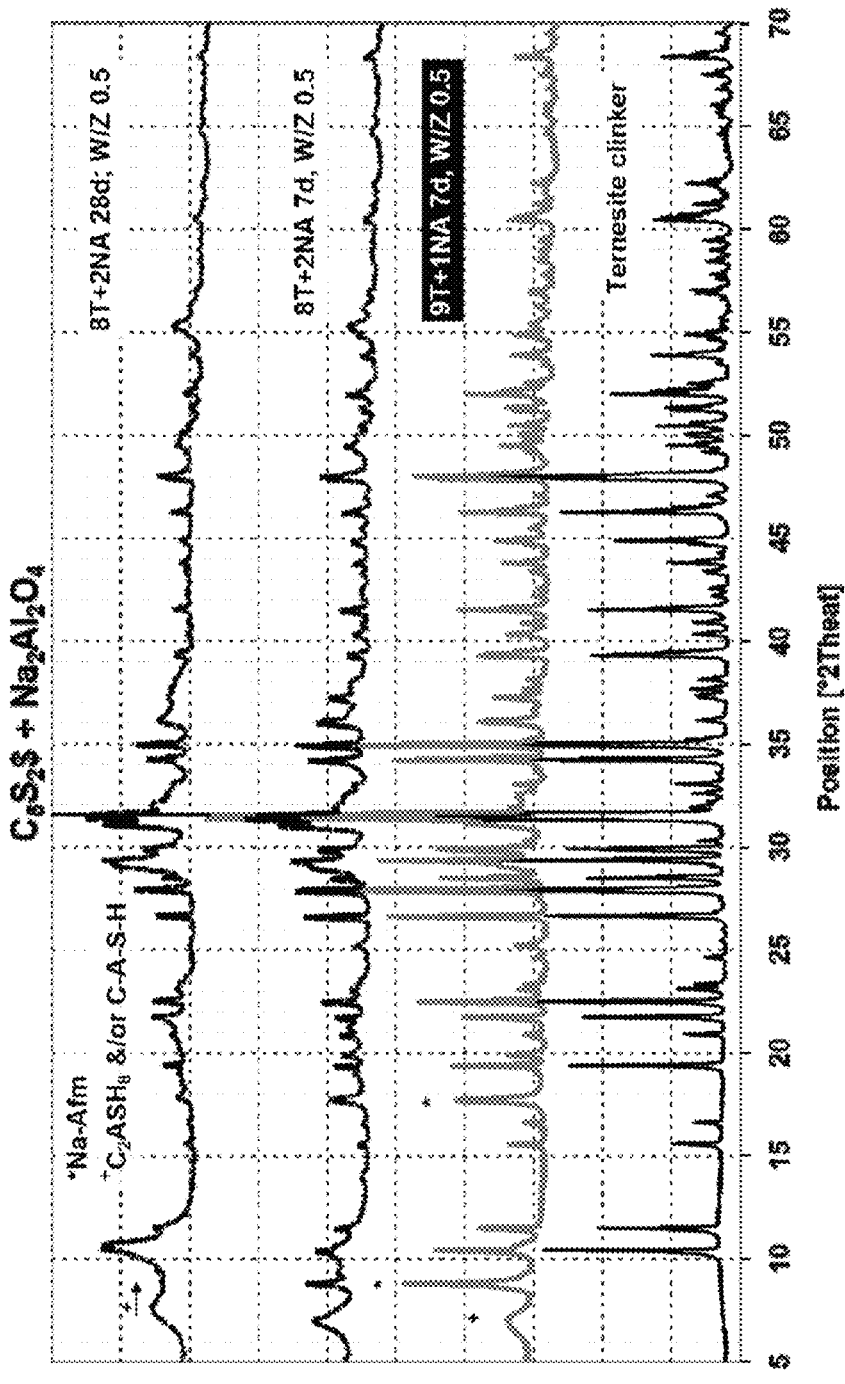

METHOD AND ADDITIVE FOR INCREASING EARLY STRENGTH

CROSS-REFERENCE TO RELATED PATENT APPLICATIONS

This application is a National Stage of International Application No. PCT/EP2012/002977, filed Jul. 16, 2012, which is based upon and claims the benefit of priority from prior European Patent Applications No. 11006757.6, filed Aug. 18, 2011, No. 11008570.1, filed Oct. 26, 2011, No. 12001488.1, filed Mar. 5, 2012, No. 12002111.8, filed Mar. 26, 2012, No. 12002342.9, filed Mar. 30, 2012, and No. 12003718.9, filed May 10, 2012, the entire contents of all of which are incorporated herein by reference in their entirety.

The present invention relates to a method for enhancing early strength, in which ternesite combined with an aluminum component accelerates the hardening of hydraulic and/or latent hydraulic binders, and to an additive for increasing early strength which contains ternesite and an aluminum component.

Cement and/or hydraulic binders are widely used building materials. One important criterion thereof is early strength. The time that is required for the hydraulic reaction to progress to the point at which appreciable and/or measurable hardening has developed is dependent upon the cement itself, upon any additives, and upon environmental conditions. Cements are available which harden very quickly of their own accord (e.g., calcium sulfoaluminate cement), along with cements which have a low early strength (e.g. blast furnace cements). Additives such as hardening accelerators on one hand and retardants and/or liquefiers on the other hand allow early strength and the onset of hardening to be adjusted within wide margins. However, additives are not always without problems. Moreover, environmental conditions, particularly temperature, also play a role. The warmer it is, the faster hardening generally occurs for a given binder system.

Despite many useful proposals, controlling early strength remains a problem for which additional solutions are constantly sought.

PRIOR ART

EP 1 171 398 B1 (DE 600 29 779 T2) describes the sintering of specific/selected, nearly exclusively natural raw materials and at least one source of $CaF_2$ at 900 to 1200° C., in order to produce, in a kiln, special clinkers which have high concentrations of crystal $X=\{(C, K, N, M)_4(A, F, Mn, P, T, S)_3(Cl, \$)\}$ and crystal $Y=\{(C_2S)_3(C\$)_3Ca(f, Cl)_2\}$ [mineral from the Ellestadite group] and/or crystal $Z=\{C_5S_2\$\}$. These clinkers are mixed with hydraulic cement or portland-type cement to produce finished cement compositions, wherein the concentration of crystal X amounts to between 15 and 75% by weight of the special clinker and at least 5% by weight of the final binder mixture.

Surprisingly, it has now been found that a significant to total quantity of the $C_5S_2\$$ phase, hereinafter referred to as ternesite, when combined with an aluminum component, reacts as early as within the first hours to days of hydration, depending upon the form and quantity of available aluminum and any sulfate carriers that may be present, and significantly influences the phase composition of the hydrated samples.

The present invention therefore solves the above problem by a method for controlling the early strength of hydraulic and latent hydraulic binders, in which, to enhance the early strength of a binder, a mixture of ternesite and an aluminum component is added. The problem is further solved by an additive that enhances early strength and contains ternesite and an aluminum component.

Aluminum components are defined as materials having high solubility and/or high reactivity, for example, soluble alkali-/earth alkali aluminates and aluminum salts (e.g., $Na_2Al_2O_4$, $K_2Al_2O_4$, aluminum nitrate, aluminum acetate, aluminum chloride, aluminum formate, aluminum sulfate, etc.), reactive and/or amorphous aluminum hydroxide, aluminum oxide hydroxides, artificial and natural pozzolans (e.g., metakaolin), or combinations thereof. However, the aluminum component alone exhibits no hydraulic or latent hydraulic behavior.

The aluminum component can be ground together with the ternesite or added as an aqueous solution/suspension and/or as an aqueous solution/suspension, which is stabilized, for example, with various acids and/or with polymers, and which can contain colloidal, nanoscale silicon oxide/silica as an additional component. The aluminum component can also be added to the mixing water, for example during production of a concrete or shortly before application of the binder.

The following abbreviations, which are common in the cement industry will be used: H—$H_2O$, C—$CaO$, A—$Al_2O_3$, F—$Fe_2O_3$, M—$MgO$, S—$SiO_2$ and $—$SO_3$. To simplify the following description, in most cases compounds will be given in their pure form, without detailed information regarding mixing sequences/substitution by foreign ions, etc., which are customary in technical and industrial materials. As any person skilled in the art will understand, the compositions of the phases identified by name in this invention, based upon the chemism of the raw mix and the method of production, can vary as a result of substitution with various foreign ions, wherein such compounds are also covered by the scope of protection of the present invention and are considered included in the specification of the pure phases/compounds.

Phases, such as $C_5S_2\$$, are indicated primarily stoichiometrically, however, the precise composition can deviate/vary. Furthermore, various foreign ions from the group comprising halogens, nonmetals, alkali- and earth alkali metals, and representatives of transitional metals and semimetals, can be incorporated into the crystal structure of the phase. All of these are suitable for the clinker according to the invention. Preferably, for example, phosphate, fluoride, boron, nitrate or chloride, but also sodium and potassium, can be incorporated into the structure of $C_5S_2\$$, whereby said structure is stabilized (e.g. at high temperatures >1200° C.) and/or forms more rapidly, with such materials generally being referred to in what follows as mineralizers.

Mineralizers are understood as substances that act as liquefiers and/or reduce the temperature that is necessary for the formation of a melt, and/or as substances that promote the formation of the clinker compound, for example, by mixed crystal formation and/or phase stabilization.

Within the scope of the present invention, clinker refers to a sintered product, which is obtained by burning a raw materials mixture at elevated temperature, and which contains at least one hydraulically reactive phase. Cement refers to a clinker that is ground with or without the addition of further components. A binder or binder mixture refers to a hydraulically hardening mixture containing a cement and typically, but not necessarily, additional finely ground components, and which is used following the addition of water, optionally admixtures and aggregate.

A clinker can already contain all the necessary and/or desired phases, and, after being ground to cement, can be used directly as a binder. Frequently, the composition of the binder is obtained by mixing two or more clinkers and/or cements, with mixing being carried out before (or during) grinding and/or in the ground state and/or during production of the binder. An addition of admixtures and additives to the cement and/or binder is also customary. Unless a specific time for mixing is stated, the following descriptions refer to binders (and cements) that are not limited in this regard.

Unless otherwise indicated, "reactive" refers to hydraulic reactivity. Reactive aluminum compounds are particularly substances that provide their aluminum for reaction following the addition of water. Preferred are soluble alkali/earth alkali aluminates, aluminum salts (e.g., $Na_2Al_2O_4$, $K_2Al_2O_4$, aluminum nitrate, aluminum acetate, aluminum chloride, aluminum formate, aluminum sulfate, etc.), amorphous and/or reactive aluminum hydroxides.

BRIEF DESCRIPTION OF THE DRAWINGS

FIG. 1 shows thermogravimetric measurements of hydrated mixtures of ternesite with metakaolin, FIG. 2 shows thermogravimetric measurements of hydrated mixtures of ternesite with $Al(OH)_3$, FIG. 3 shows thermogravimetric measurements of hydrated mixtures of ternesite with $NaAlO_2$, FIG. 4 shows x-ray diffractograms of binders of ternesite with $NaAlO_2$ and the phase development thereof over time.

Heretofore, ternesite (also called sulfospurrite, sulfate spurrite or calcium sulfosilicate) has been described as non-reactive, inert or less reactive, and undesirable (see, e.g., "Synthesis of Calcium Sulfoaluminate Cements From $Al_2O_3$-Rich By-products from Aluminum Manufacture", Milena Marroccoli et al., The second international conference on sustainable construction materials and technologies 2010, "Synthesis of Special Cements from Mixtures Containing Fluidized Bed Combustion Waste, Calcium Carbonate and Various Sources of Alumina", Belz et al., 28th Meeting of the Italian Section of The Combustion Institute 2005, "Fluidized Bed Combustion Waste as a Raw Mix Component for the Manufacture of Calcium Sulphoaluminate Cements", Belz G et al., 29th Meeting of the Italian Section of The Combustion Institute, 2006 and "The Fabrication of Value Added Cement Products from Circulating Fluidized Bed Combustion Ash", Jewell R. B et al., World of Coal Ash (WOCA) Covington, Ky., USA, 2007). Moreover, methods for avoiding this "undesirable phase" are highlighted on a regular basis.

The combination with an aluminum component according to the invention, however, causes a reaction to occur very early. The aluminum component must release sufficient quantities of aluminum in the aqueous phase in which the hydraulic reaction takes place. Therefore, suitable aluminum compounds are those that are either readily water soluble or those in which despite a low possible concentration, but said concentration dissolves very rapidly. Therefore, the principal task is not to provide a high concentration of aluminum, but for an adequate concentration, which may also be low, to be constantly available. This can be achieved both with readily soluble compounds and with compounds that have only a low solubility but a very rapid dissolution process, so that aluminum is supplied in addition in the amount in which it is reacted.

$C_5S_2\$$ or ternesite-rich clinker can be produced by sintering raw materials that supply sufficient quantities of CaO, $SiO_2$ and $SO_3$. In this, on one hand, pure or substantially pure raw materials, such as calcium carbonate or calcium oxide, ground quartz or microsilica, and calcium sulfate are suitable. On the other hand, a plurality of natural but also industrial materials, such as, but not limited to, limestone, dolomite, bauxite, clay/claystone, calcined clay (e.g., metakaolin), basalt, periodite, dunite, ignimbrite, carbonatite, ash/slag/granulated blast furnace slag of high or low quality (mineralogy/glass content, reactivity, etc.), various waste dump slags materials, red and brown muds, natural sulfate carriers, desulfurization sludge, phosphogypsum, flue gas desulfurization gypsum, titanogypsum, fluorogypsum, etc., in suitable combination can be used as raw material. Substances/substance groups which are not listed by name but which satisfy the minimum chemical requirements for potential raw materials are also covered by the scope of protection. The raw materials may, but need not necessarily be, pretreated.

Ternesite or ternesite-rich clinker can be obtained industrially in one step by sintering the homogenized, fine-particle raw materials in a rotary kiln at at least 900° C., typically within a range of 1000° C. to 1300° C., particularly 1050° C. to 1200° C. and even more preferably 1100° C. to 1150° C. A sufficient quantity of ternesite is typically formed within a period of 10 to 240 min., preferably 30 min to 90 min.

The clinker produced in this manner is highly porous and can be easily ground, and the reactivity of the clinker can be selectively adjusted and/or optimized, e.g., by increasing the fineness and/or the concentrations of α $C_2S$, according to the respective requirements of the binder. This can also be achieved by adding mineralizers to the raw mix, wherein a part, up to the predominant portion, of the dicalcium silicate is present as a polymorph of $C_2S$ and/or in the form of mixed crystals or doped "α" $C_2S$, such as, for example, in the presence of $P_2O_5$ as calcium phosphate silicate [$Ca_2SiO_4 \cdot 0.05Ca_3(PO_4)_2$]. The formation of at least one melt phase (e.g., a calcium silicate melt phase in the system CaO—$SiO_2$—$CaSO_4$—± mineralizer, but also in the system CaO—$Al_2O_3$ ($Fe_2O_3$)—$SiO_2$—$CaSO_4$—± mineralizer) is favored and/or triggered.

As a further advantage, the clinker can have selectively increased magnesium/periclase concentrations (>2% by weight) when lower burning temperatures are set (<1100° C.). Periclase can be present in a reactive form, and can contribute to hardening/hydration.

Surprisingly, it has further been found that the heating rate and the use of mineralizers (e.g., $Ca_3P_2O_8$, $CaF_2$, $Na_2CO_3$, $K_2CO_3$, $FeCl_3$, $MgCl_2$) exert significant influence on the composition of the clinker and the quantity and proportions of the reactive phases. A high heating rate (kiln set to the desired target temperature, i.e., the raw mix has been sintered directly at the corresponding temperature) stabilizes $C_5S_2\$$ even at higher temperatures and also the use of mineralizers. At lower heating rates, in addition to ternesite, more polmorphs of α $C_2S$ and mixed crystals of α $C_2S$ and the mineralizer form.

The formation of a melt phase can be selectively controlled by the selection of the heating rate, the maximum burning temperature, the cooling rate and/or the addition of mineralizers.

For producing ternesite, a two-stage process has also proven advantageous if, for example, raw materials containing a high percentage of crystalline high-temperature phases are used. In this case, the sintering and/or burning of the raw mix is carried out in a first step at more than 1200° C. to 1350° C., preferably at 1250° C. to 1300° C., wherein any undesirable crystalline high-temperature phases (e.g., $C_2AS$, $C_2F$, etc.) are destroyed/converted and phases with positive/desirable properties (e.g., $C_4(A_xFe_{1-x})_3\$$ with x being 0.1 to 1, preferably 0.8 to 0.95) are formed. The period of sintering at >1200° C. is typically 10 min. to 240 min., preferably 30 min. to 90 min.

However, sintering at >1200° C. is associated with a significant disadvantage. Typically, if mineralizers are not present in sufficient quantities for stabilizing the phase at higher temperatures, or if the heating rate is not high enough, the desired $C_5S_2\$$ phase is not stable beyond a temperature of ±1180° C. ("Ternesite, $Ca_5(SiO_4)_2SO_4$, a new mineral from Ettringer Bellerberg/Eifel Germany" Irran et al., 1997, Mineralogy and Petrology Vol 60, "Phase compatibility in the system $CaO$—$SiO_2$—$Al_2O_3$—$Fe_2O_3$—$SO_3$ referred to sulphoaluminate belite cement clinker" Sahu & Majling 1993, CCR Vol. 23, "Phase changes in the system $CaO$—$Al_2O_3$—$SiO_2$—$Fe_2O_3$—$MgO$—$CaSO_4$—$K_2SO_4$ in air up to 1300° C. referred to sulphoaluminate cement clinker" Kapralik & Hanic 1986, Br. Ceram. Trans. J. Vol. 85) and disintegrates into $C_2S$ and $C\$$. Therefore, according to the invention, sintering at more than 1200° C. is combined with a selective cooling of the clinker, retarded in relation to the customary time, over a range of 1200° C. to 750° C., in order to selectively form $C_5S_2\$$.

Therefore, the intermediate clinker product obtained in the first step is selectively tempered in the kiln chamber and/or in the cooler system, wherein it passes through a temperature range from 1200° C. to 750° C., preferably from 1150 to 850° C., and particularly from 1180° C. to 1050° C., for a period of time which is sufficient to form the desired quantity of $C_5S_2\$$. At the same time, a certain quantity of aluminate phases and ferrate phases and residues of crystalline high-temperature phases of the raw materials react with existing $C\$$ to form additional $C_4(A_xF_{(1-x)})_3\$$ and $C_5S_2\$$. The intermediate clinker product is to pass through the temperature range of between 1200° C. and 1050° C. for a period of 10 min. to 180 min., preferably 25 min. to 120 min. and even more preferably 20 min. to 90 min. During cooling, the clinker can pass through a range of 1050° C. to 750° C., preferably 1050° C. to 850° C., for a period of 5 min. to 120 min., preferably 10 min. to 60 min.

Finally, the clinker is rapidly cooled in a known manner, so that additional phase conversions are prevented.

By burning at more than 1200° C., existing or forming undesirable phases, such as those from the melilite group, for example, are again destroyed. A temperature of around 1250° C. is also optimal for the formation of the highly reactive $C_4(A_xF_{(1-x)})_3\$$ phase. On the one hand, this phase represents an aluminum source which can activate $C_5S_2\$$, so that an additional external aluminum component is not necessary or is necessary only in small quantities. On the other hand, specifically when industrial byproducts, such as, e.g., ash and slag, but also materials containing e.g., clay, are used as part of the raw mix, under certain circumstances substantial quantities of $Al_2O_3$ are introduced, which are used most expediently in terms of economy and ecology in this procedure.

With the tempering in the second step, ternesite is (re) formed in a sufficient quantity. As a result of selective temperature control, the intermediate clinker product passes through a temperature range of 1200° C. to a lower limit of 750° C., preferably a range of 1150 to 850° C., for a period of time that is sufficient for ternesite to form during the tempering step, and is only then rapidly cooled. It has further been found that various aluminate and ferrate phases, along with remnants of the crystalline high-temperature phases of the raw materials, for example, but not exclusively, $C_4AF$, $C_2F$, $CF$, $CA_2$, $A_3S_2$, $C_2AS$, etc., react with existing $C\$$ during the controlled cooling process in the tempering step and result in an increase in the desired reactive $C_5S_2\$$ and $C_4(A_xF_{(1-x)})_3\$$ phases. If the $C_4(A_xF_{(1-x)})_3\$$ phase (formed at more than 1200° C.) selectively passes through a range of 1150° C. to 1050° C., it becomes measurably richer in iron as a result of the consumption/reaction of, for example, $C_4AF$, $C_2F$, $CF$, and its quantity increases.

Iron contained in the raw mix is incorporated into the $C_2AF$ phase and preferably into the $C_4A_3\$$ phase. The incorporation of foreign ions and/or the addition of mineralizers can lead to an increased rate of formation of the phase in the hot zone, which can in turn potentially decrease the necessary residence time and/or result in a quantitative increase of the desired phase. The term $Al_2O_3(Fe_2O_3)$, as in the designation $C_4(A_xF_{1-x})_3\$$ for the clinker phase, means that aluminum can be partially replaced by iron, i.e., x is a number between 0.1 and 1.0, preferably between 0.8 and 0.95. Typically, primarily aluminum is present, along with small admixtures of iron, however, it is within the scope of the invention to use substantial quantities of iron, up to a predominant proportion of iron.

One test for the incorporation of iron is a quantitative decrease in iron-rich phases (e.g., $Fe_3O_4$, $C_2F$ and $C_4AF$), an increase in the $C_4A_3\$$ or $C_4(A_xFe_{(1-x)})_3\$$ phase, and an increase in peak intensities and in the lattice parameter c (Å) [crystal system: orthorhombic] from 9.1610 [PDF-Number: 01-085-2210, tetracalcium hexaaluminate sulfate(VI) —$Ca_4(Al_6O_{12})(SO_4)$, ICSD Collection Code: 080361, calculated from ICSD using POWD-12++, (1997), structure: Calos, N. J., Kennard, C. H. L., Whittaker, A. K., Davis, R. L., J. Solid State Chem., 119, 1, (1995)] over 9.1784 [PDF-Number: 00-051-0162, calcium aluminum iron oxide sulfate —$Ca_4((Al_{0.95}Fe_{0.05}))_6O_{12}(SO_4)$, ICSD Collection Code:—, primary reference: Schmidt, R., Pöllmann, H., Martin-Luther-Univ., Halle, Germany., ICDD Grant-in-Aid, (1999)] up to values greater than 9.2000. The test for any mixed crystal formation can also be made by determining the occupation factors with a Rietveld refinement through secondary or mixed occupations of individual atomic positions. A further purely qualitative indicator is the sometimes pronounced color change of the clinker. For instance, the color of the clinker changes from a chestnut/ochre brown to a greenish brown to a light grey hue.

Ternesite also occurs as a mineral, but no deposits are known from which it can be obtained in sufficient quantity and/or purity, and therefore, although the use of "natural" ternesite is possible, in practical terms it is uneconomical. Production by sintering suitable raw materials is preferred according to the invention.

The raw materials used for production of the ternesite clinker according to the invention are ground to the customary fineness in a known manner. Degrees of fineness from 2000 to 10000 $cm^2/g$, preferably from 3000 to 6000 $cm^2/g$ and particularly preferred from 4000 to 5000 $cm^2/g$ are particularly suitable. The grinding fineness is based primarily on the nature and composition of the raw material used, the burning process (temperature, residence time in the sintering zone, etc.), and the desired properties of the binder and the technical options that are available.

If production is intended to result in the purest possible $C_5S_2\$$, raw materials are selected which, in addition to sources for $CaO$, $SiO_2$ and $SO_3$, contain no or only few additional constituents. The reaction of calcium carbonate with ground quartz and calcium sulfate in the temperature range of 900 to 1200° C., preferably 1050 to 1150° C., produces $C_5S_2\$$ having a purity of >99%. At temperatures >1200° C. the addition of mineralizers should be taken into consideration.

However, it is preferable for the greatest possible percentage of cost-effective and environmentally compatible raw materials to be used for producing $C_5S_2\$$. Environmentally compatible in this case means the lowest possible energy consumption and/or the conservation of natural raw materials and/or high-quality waste and byproducts. The use of such materials as a component of the raw mix is not found in the patent EP 1 171 398 B1.

A reaction of approximately 25% of fly ash FA1 (see examples 2 and 3) with approximately 45% limestone K1, approximately 8% quartz (Merck, analytical grade) and approximately 20% microA (natural anhydrite) resulted in a clinker having a $C_5S_2\$$ concentration of >70%, and with a reaction of ~8% metakaolin, ~58% K1, ~23% micro A and ~10% $SiO_2$, purities of >80% were achieved.

Depending upon the raw materials composition, particularly as a result of the presence of mineralizers, a single-stage process for producing a ternesite clinker, even at elevated temperatures of, e.g., up to 1300° C., can be suitable, for example, when relevant quantities of phosphorous are contained, as is the case when a phosphogypsum is used. However, in contrast to the known methods/clinkers, according to the invention, the formation of ternesite but also the formation of reactive polymorphs of the dicalcium silicate is the focus, and therefore, the sintering temperature is optimized for the formation thereof. According to the invention in question, at these temperatures, in addition to ternesite, more reactive polymorphs of the dicalcium silicate can result. In contrast, in the prior art the sintering temperature has been optimized for the formation of $C_4A_3\$$, and ternesite is not to be formed, if possible.

The clinker that contains $C_5S_2\$$ as its primary component or a cement that is obtained therefrom by grinding without additives contains the following components in the proportions indicated according to the invention:

$C_5S_2\$$ 10 to 100% by weight,
  preferably 20 to 90% by weight and even more preferably 40 to 70% by weight
$(\alpha, \beta) C_2S$ 0 to 90% by weight,
  preferably 10 to 80% by weight and even more preferably 30 to 60% by weight
$C_4(A_xF_{(1-x)})_3\$$ 0 to 30% by weight,
  preferably 5 to 20% by weight and even more preferably 8 to 15% by weight
$C_2(A_yF_{(1-y)})$ 0 to 30% by weight,
  preferably 5 to 20% by weight and even more preferably 8 to 15% by weight
Reactive aluminates 0 to 20% by weight,
  preferably 1 to 15% by weight and even more preferably 3 to 10% by weight
Periclase (M) 0 to 25% by weight,
  preferably 1 to 15% by weight and even more preferably 2 to 10% by weight
Secondary phases 0 to 30% by weight,
  preferably 3 to 20% by weight and even more preferably 5 to 10% by weight referred to the total quantity of clinker/cement, wherein the proportions of the phases add up to 100%. In the $C_4(A_xF_{(1-x)})_3\$$ phase, x ranges from 0.1 to 1, preferably from 0.8 to 0.95. In the $C_2(A_yF_{(1-y)})$ phase, y ranges from 0.2 to 0.8 and preferably from 0.4 to 0.6.

The designation $(\alpha, \beta) C_2S$ defines polymorphs of $C_2S$ and mixtures thereof, wherein the reactive $\alpha$ polymorphs (e.g., $\alpha$, $\alpha'_L$, $\alpha'_H$) are preferred. Preferably, at least 5% by weight a polymorphs of $C_2S$ are contained, since these advantageously contribute to early strength.

By adding mineralizers to the raw mix, a portion, up to the predominant portion, of the dicalcium silicate can be present in the form of mixed crystals as doped "$\alpha$" $C_2S$, for example, in the presence of $P_2O_5$ as calcium-phosphate-silicate $[Ca_2SiO_4 \cdot 0.05Ca_3(PO_4)_2]$. Such compounds are also included in the group of reactive $\alpha$ $C_2S$ polymorphs and are covered by the scope of protection of the present invention. Any mineralizer, depending upon the added quantity, the heating rate, etc., can also be incorporated into the structure of $C_5S_2\$$, for example.

A ternesite clinker containing, among other things, reactive $\alpha$ polymorphs of $C_2S$ and doped "$\alpha$" $C_2S$ and doped $C_5S_2\$$ has not been previously described and is not found in the patent EP 1 171 398 B1.

Reactive aluminates designate, for example, but not exclusively, $C_3A$, CA and $C_{12}A_7$.

Examples of secondary phases that can occur include, but are not limited to, alkali/earth alkali sulfates, quartzes, spinels, olivines, pyroxenes, representatives of the melilite and merwinite groups, apatites, ellestadites, silicocarnotite, free lime, spurrite, quartz and/or an x-ray amorphous phase constituent/glass phase, in a proportion of 0% by weight to 30% by weight, preferably 2% by weight to 20% by weight and especially preferred 5% by weight to 15% by weight. The free lime concentration of the clinker is less than 5% by weight, preferably less than 2% by weight and particularly preferred less than 1% by weight. In a preferred embodiment, the ternesite clinker contains 1 to 10% by weight, preferably 2 to 8% by weight and even more preferably 3 to 5% by weight of at least one x-ray amorphous phase/glass phase.

A ternesite clinker containing, among other things, an x-ray amorphous phase constituent/glass phase has not been previously described and also is not found in the patent EP 1 171 398 B1.

The concentrations of the primary oxides of a separately produced clinker containing $C_5S_2\$$ as the primary phase comprise the following ranges:

CaO 40 to 70% by weight, preferably 45 to 60% by weight and even more preferably 50 to 55% by weight
$SiO_2$ 5 to 30% by weight, preferably 10 to 25% by weight and even more preferably 15 to 23% by weight
$SO_3$ 3 to 30% by weight, preferably 5 to 26% by weight and even more preferably 8 to 22% by weight
$\Sigma(Al_2O_3+Fe_2O_3)$ 0 to 40% by weight, preferably 5 to 30% by weight and even more preferably 8 to 20% by weight
MgO 0 to 25% by weight, preferably 2 to 15% by weight and even more preferably 5 to 10% by weight referred to the total quantity of clinker/cement, wherein the proportions of the concentrations add up to 100%.

A selective production of a $C_5S_2\$$ clinker, the stabilization of $C_5S_2\$$ at elevated temperatures, the potentially increased formation rate of $\alpha$ $C_2S$, mixed crystals of the dicalcium silicate and the formation of at least one melt phase in the clinker and the use of the ternesite clinker as an additive in combination with reactive, aluminum-rich systems for the purpose of increasing the early strength of binders has not previously been described. It is an entirely new approach to increase early strength and/or the durability of hydraulic and latent hydraulic binder systems.

Ternesite and/or ternesite-rich clinker as a component of the additive according to the invention is then further processed in a manner similar to that for known clinkers to cement or to binder mixtures.

For producing cement or binder mixtures, ternesite and/or ternesite-rich clinker is ground in a known manner, together with one or more or all of the additional binder components to be ground or separately therefrom, with or without additional sulfate carriers, to customary cement fineness levels (according to Blaine) of 2000 to 10000 $cm^2/g$, preferably 3000 to 6000 $cm^2/g$, and particularly preferred 4000 to 5000 $cm^2/g$.

Alkali- and/or earth alkali sulfates, preferably in the form of gypsum and/or hemihydrate and/or anhydrite, but also in the form of magnesium sulfate, sodium sulfate and potassium sulfate, are particularly suitable as sulfate carriers. Because ternesite also supplies sulfate during the course of the reaction, a readily processable binder can also be obtained with less of another kind of sulfate carrier or without such a carrier.

The control of early strength according to the invention is accomplished by mixing ternesite and/or ternesite-rich clinker, with or without the addition of the aluminum component, to form a binder mixture. In the case of a binder that itself already contains an aluminum component, the addition of ternesite, optionally in pure form, may be sufficient for controlling the early strength of the binder. As a rule, however, ternesite and an aluminum component are used. The ground ternesite or ternesite-rich clinker is combined with an aluminum component and added to the binder, or ternesite or ternesite-rich clinker and an aluminum component are added separately.

Inherently hydraulically reactive materials such as calcium aluminate, calcium aluminate cement, calcium sulfoaluminate, calcium sulfoaluminate cement, geopolymer cement and/or latent hydraulic materials such as burned oil shale, gehlenite glasses or combinations thereof can also be added to the binder. Mixing with hydraulically or latent hydraulically reactive components is not necessary to achieve a usable hydraulic reactivity; rather, the ternesite that is ground to cement exhibits the desired hydraulic reactivity as a result of the combination with a non-hydraulically reactive aluminum source.

The additive according to the invention comprises at least ternesite and an aluminum component. Ternesite can be present in the form of a ternesite-rich clinker. It may also contain additional constituents, e.g., additional accelerating agents. The at least two constituents of the additive are present in the following proportions: Ternesite or ternesite clinker in a range from 10 to 99% by weight, preferably 20 to 95% by weight and even more preferably 40 to 90% by weight, and a source of rapidly available aluminum in a range from 1 to 90% by weight, preferably 5 to 80% by weight and even more preferably 10 to 60% by weight.

As cement or binder, the early strength of which can be controlled, hydraulic binders, such as portland cement, portland composite cement, blast furnace cement, pozzolan cement, multicomponent/composite cement, super sulphated cement, calcium aluminate cement, calcium sulfoaluminate cement, geopolymer cement, etc. and latent hydraulic binders such as ground granulated blast furnace slag, lime-rich fly ash, etc. may be used. Typically, the cement or the binder contains alkali and earth alkali sulfates, in addition to the constituents of the additive according to the invention, and can also contain free lime.

The binder preferably also contains additives. These include non-hydraulically active substances, for example, ground limestone/dolomite, precipitated $CaCO_3$, $Mg(OH)_2$, $Ca(OH)_2$, silica fume, etc., and they can be metered in an amount ranging from 0.01 to 20% by weight, preferably 0.5 to 15% by weight and even more preferably of 1 to 10% by weight.

The additive according to the invention, in other words, the total of ternesite (clinker) and at least one source of rapidly available aluminum, is contained in the binder mixture in a proportion of 1 to 20% by weight, preferably 2 to 15% by weight and particularly preferred 5 to 10% by weight.

In the processing of the cement or binder, a water/binder value of 0.2 to 2, preferably 0.3 to 0.8 and particularly preferred 0.35 to 0.5 is suitable.

The cement or the binder mixture thereof can contain one or more admixtures in addition to the additive according to the invention. Preferably, it contains one or more additional setting and/or hardening accelerators, preferably selected from lithium salts and lithium hydroxides, other alkali salts and alkali hydroxides, and alkali silicates. It further preferably contains concrete plasticizers and/or water reducing admixture, preferably based on lignin sulfonates, sulfonated naphthalene, melamine or phenolformaldehyde condensate, or based on acrylic acid acrylamide mixtures or polycarboxylate ethers, or based on phosphated polycondensates, phosphated alkylcarboxylic acid and salts thereof, (hydroxy)carboxylic acids and carboxylates, borax, boric acid and borates, oxalates, sulfanilic acid, aminocarboxylic acids, salicylic acid and acetylsalicylic acid, and dialdehydes.

Additives, such as alkali aluminates and alkali salts, alkali silicates and alkali hydroxides, for example, which further increase the pH level of the solution and, in combination with this, the reactivity of $C_5S_2\$$, are particularly preferred and can be metered in an amount ranging from 0.01 to 10% by weight, preferably 0.5 to 5% by weight and even more preferably 1 to 2% by weight.

The reactivity of ternesite is dependent particularly on the availability of a reaction partner, for example, but not limited to, aluminum, but also on the sulfate that is present in the solution. When ternesite is mixed with water, a part of the calcium, silicon and sulfate dissolves. However, the sulfate in solution appears to cause an inhibition of the further reaction of the calcium silicate. In the presence of aluminum, soluble sulfates and calcium carriers, $AF_t$ and/or $AF_m$ form, whereby sulfate is consumed and the continued reaction of $C_5S_2\$$/the formation of $(N,C)$-$(A)$-S—H and/or stratlingite ($C_2ASH_8$) is induced. If the available aluminum is consumed at a certain time, the solution is again enriched with sulfate and the reaction of $C_5S_2\$$ is halted/retarded. In this manner, however, $AF_t$ that has already formed is stabilized by the sulfate that is available in the pore solution, and a conversion to $AF_m$ is avoided/minimized. The described parameters/properties of $C_5S_2\$$ can therefore contribute to greater early and final strength, and to the durability of various binders.

The invention will be described in reference to the following examples, without being limited to the specifically described embodiments. Unless otherwise indicated, or unless otherwise necessitated by the context, percentages are referred to weight, in cases of doubt to the total weight of the mixture.

The invention also relates to all combinations of preferred embodiments, unless these are mutually exclusive. The indications "approximately" or "ca." in combination with numerical data mean that at least 10% higher or lower values or 5% higher or lower values and in any case 1% higher or lower values are included.

EXAMPLES

Table 1 characterizes the latent-hydraulic and/or pozzolanic materials and/or raw materials used, with which the examples described in what follows have been carried out, including their primary oxidic constituents and their grinding fineness. The weight loss following tempering at 1050° C. is also indicated.

TABLE 1

| Material Sample | | Limestone | Ground granulated slag | Fly Ash | Sulfate | Al-Corr. | Metakaolin |
|---|---|---|---|---|---|---|---|
| RFA | Unit | K1 | BFS | FA1 | MicroA | Al(OH)$_3$ | MK |
| GV 1050° C. | % | 43.09 | 1.80 | 0.82 | 4.64 | 34.64 | 1.91 |
| SiO$_2$ | | 1.53 | 36.48 | 28.50 | 4.17 | — | 48.00 |
| Al$_2$O$_3$ | | 0.35 | 11.58 | 12.50 | 1.36 | 65.36 | 41.60 |
| TiO$_2$ | | 0.03 | 0.88 | 1.05 | 0.04 | — | 0.00 |
| MnO | | 0.01 | 0.37 | 0.18 | 0.00 | — | 0.00 |
| Fe$_2$O$_3$ | | 0.19 | 0.52 | 5.18 | 0.37 | — | 1.80 |
| CaO | | 54.50 | 38.46 | 37.40 | 37.40 | — | 5.70 |
| MgO | | 0.22 | 7.52 | 4.81 | 1.82 | — | 0.10 |
| K$_2$O | | 0.04 | 0.44 | 0.28 | 0.28 | — | 0.95 |
| Na$_2$O | | 0.00 | 0.18 | 0.07 | 0.06 | — | 0.00 |
| SO$_3$ | | 0.01 | 2.19 | 7.71 | 49.80 | — | 0.00 |
| P$_2$O$_5$ | | 0.01 | 0.00 | 1.27 | 0.00 | — | 0.00 |
| Total | | 99.98 | 100.42 | 99.77 | 99.94 | 100.00 | 100.06 |
| Amorphous | % | / | >99 | 38.0 | — | — | >95 |
| Density | g/cm$^3$ | 2.64 | 2.81 | 2.82 | — | — | 2.54 |
| Grinding fineness according to Blaine | cm$^2$/g | 3350 | 4370 | 4380 | — | — | — |

Example 1

T$_{pur}$

A stoichiometric mixture of CaCO$_3$ [Merck, analytical grade], CaSO$_4$ [Merck, analytical grade], and ground quartz [Merck, analytical grade] was burned for 1 hour at 1100° C., then rapidly cooled, ground, burned again for 1 hour at 1100° C., and rapidly cooled. This resulted in a ternesite clinker with >99% C$_5$S$_2$$.

Example 2

TK$_{FA}$

The raw mix consisted of 45% by weight limestone (K1)+ 27% by weight FA1, 20% by weight microA and 8% by weight ground quartz (Merck, analytical grade). The raw mix was sintered at 1100° C. and after sintering was passed through a cooling program for tempering, in which the temperature was decreased over a period of approximately 35 min. from 1100° C. to 850° C. The clinker was then rapidly cooled in air.

Example 3

TK$_{AGS}$

The raw mix consisted of 58% by weight K1+8% by weight MK, 24% by weight microA and 10% by weight ground quartz (Merck, analytical grade). The raw mix was subjected to the same program as in example 2.

The calculated chemical and measured mineralogical composition of the ternesite clinker qualities of examples 1 to 3 are listed in Table 2.

TABLE 2

Chemical (calculated) and mineralogical composition of the clinker from examples 1 to 3

| | T$_{pur}$ | TK$_{FA}$ | TK$_{AGS}$ |
|---|---|---|---|
| Oxides | | | |
| SiO$_2$ | 25.00% | 21.30% | 22.16% |
| Al$_2$O$_3$ | — | 4.75% | 4.94% |
| TiO$_2$ | — | 0.38% | 0.04% |
| MnO | — | 0.07% | 0.01% |
| Fe$_2$O$_3$ | — | 1.96% | 0.45% |
| CaO | 58.34% | 53.20% | 55.34% |
| MgO | — | 2.23% | 0.77% |
| K$_2$O | — | 0.19% | 0.22% |
| Na$_2$O | — | 0.04% | 0.02% |
| SO$_3$ | 16.66% | 15.44% | 16.06% |
| P$_2$O$_5$ | — | 0.44% | 0.01% |
| Phases | | | |
| Anhydrite | 0.4 | 0.3 | 0.2 |
| C$_3$A (cub) | — | 2.2 | — |
| C$_3$A (orth) | — | 1.2 | 0.4 |
| C$_2$S a'H | — | 2.7 | 1.4 |
| C$_2$S beta | — | 5.7 | 3.2 |
| C$_2$S gamma | — | 1.1 | 0.4 |
| ΣC$_2$S | — | 9.5 | 5.0 |
| Ternesite | 99.2 | 74.9 | 85.5 |
| Free lime | <0.1 | 0.3 | 0.3 |
| Periclasite | — | 1.2 | 0.5 |
| C$_4$A$_3$S | — | 9.3 | 7.0 |
| Augite | — | 1.2 | 1.1 |
| Quartz | 0.4 | — | — |
| Ratios | | | |
| CaO/Al$_2$O$_3$ | — | 11.21 | 11.21 |
| Al$_2$O$_3$/Fe$_2$O$_3$ | — | 2.42 | 10.92 |
| SO$_3$/(Al$_2$O$_3$ + Fe$_2$O$_3$) | — | 2.30 | 2.98 |
| SO$_3$/SiO$_2$ | 0.67 | 0.72 | 0.72 |
| CaO/SO$_3$ | 3.50 | 3.45 | 3.45 |
| CaO/SiO$_2$ | 2.33 | 2.50 | 2.50 |
| MgO/SiO$_2$ | 0.00 | 0.10 | 0.03 |

Example 4

Hardening

Hardening is analyzed using a semi-quantitative testing method. For this process, 20 g of a binder is mixed in by hand at 20° C. and at a specified water/cement ratio (demin. water) in a plastic beaker using a spatula spoon for 2 minutes, and is transferred to a small, air-tight sealable plastic bag, after which the setting and hardening behavior of the paste is tested by bending and finger pressure, and is analyzed based on a numerical system. This method is particularly well suited to a relative analysis of solidifying processes before and during the solidification of binders within the framework of serial samples, which are modified gradually and systematically. It represents a meaningful precursor to standardized tests, in which, using small quantities of materials, the action tendency of specific additives or binder mixtures, optionally based on a relatively large number of individual experiments, becomes apparent. "+/−" stands for the solidifying of the pastes, with one or more "+" indicating the solidification and the increasing degree of hardness of the paste, with "+++" representing very high strength. In comparative mortar and compressive strength tests, "+++" correlated to a strength of between 2 and 10 MPa. A "−" indicates that no perceivable solidification has occurred.

Binders and/or mixtures were produced with a water/cement ratio of 0.5 from a ternesite clinker according to example 1, $Na_2Al_2O_4$=NA (Merck, analytical grade), a metakaolin=MK and an amorphous aluminum hydroxide=Al(OH)$_3$ (Sika, Geloxal). The mixing proportions are indicated in Table 3 and the measurements of the development of strength are summarized in Table 4. NA was ground as a solid material together with the ternesite clinker, because when NA was present dissolved in the mixing water, immediate solidification occurred in contact with ternesite and analysis based upon the semi-quantitative testing method was no longer possible, or the use of retarding agents was necessary.

TABLE 3

| Mixture | $T_{pur}$ | $Na_2Al_2O_4$ [%] | Metakaolin | AlOH$_3$ |
|---|---|---|---|---|
| T | 100 | | | |
| NA | | 100 | | |
| MK | | | 100 | |
| AH$_3$ | | | | 100 |
| 9T + 1NA | 90 | 10 | | |
| 8T + 2NA | 80 | 20 | | |
| T-MK | 70 | | 30 | |
| 9T + 1AH$_3$ | 90 | | | 10 |
| 8T + 2AH$_3$ | 80 | | | 20 |
| 7T + 3AH$_3$ | 70 | | | 30 |
| 8T + 2NA + VZ* | 80 | 20 | | |
| 8T + 2NA + VZ** | 80 | 20 | | |

VZ* = Retardant system
VZ** = Retardant system, $Na_2Al_2O_4$ dissolved in mixing water

TABLE 4

| | Time [Minutes] | | | | | | | | | |
|---|---|---|---|---|---|---|---|---|---|---|
| Mixture | 0.5 | 1 | 5 | 10 | 30 | 60 | 120 | 240 | 360 | 1440 |
| T | − | − | − | − | − | − | − | − | − | − |
| NA | − | − | − | − | − | − | − | − | − | − |
| MK | − | − | − | − | − | − | − | − | − | − |
| AH$_3$ | − | − | − | − | − | − | − | − | − | − |
| 9T + 1NA | + | + | ++ | ++ | ++ | ++ | +++ | +++ | +++ | +++ |
| 8T + 2NA | + | ++ | ++ | ++ | ++ | +++ | +++ | +++ | +++ | +++ |
| 7T + 3MK | − | − | − | − | + | + | + | ++ | ++ | +++ |
| 9T + 1AH$_3$ | − | − | − | − | +/− | +/− | + | + | + | ++ |
| 8T + 2AH$_3$ | − | − | − | − | + | + | + | ++ | ++ | ++ |
| 7T + 3AH$_3$ | − | − | − | − | + | + | + | ++ | ++ | +++ |
| 8T + 2NA + VZ* | − | − | − | ++ | ++ | +++ | +++ | +++ | +++ | +++ |
| 8T + 2NA + VZ*+ | − | − | + | ++ | ++ | +++ | +++ | +++ | +++ | +++ |

It is apparent that neither the aluminum component nor ternesite alone exhibited a hydraulic reaction. However, the mixture of aluminum component and ternesite showed a significant solidification to a hardening within only a few seconds or hours.

Example 5

An additive comprising 8 parts by weight ternesite from example 1 with 2 parts by weight $Na_2Al_2O_4$ (TNA, solid material) was mixed in various ratios with ground granulated blast furnace slag (BFS) and/or portland cement (PC) (CEMI 42.5, Werk Leimen, HeidelbergCement AG, DE) to form a binder (see Table 5). The hardening was analyzed according to example 4. The results are listed in Table 6.

TABLE 5

| Mixture | TNA | BFS [%] | PC | NA |
|---|---|---|---|---|
| BFS | | 100 | | |
| 9.95BFS + 0.05NA | | 99.5 | | 0.5 |
| 9.95BFS + 0.05TNA | 0.5 | 99.5 | | |
| 9.9BFS + 0.1TNA | 1 | 99 | | |
| 9.8BFS + 0.2TNA | 2 | 98 | | |
| PC | | | 100 | |
| 9.95PC + 0.05NA | | | 99.5 | 0.5 |
| 9.9PC + 0.1NA | | | 99 | 1 |
| 9.8PC + 0.2NA | | | 98 | 2 |
| 9.5PC + 0.5TNA | 5 | | 95 | |
| 9BFS + 1PC | | 90 | 10 | |
| 8.95BFS + 1PC + 0.05TNA | 0.5 | 89.5 | 10 | |
| 8.9BFS + 1PC + 0.1TNA | 1 | 89 | 10 | |
| 8.8BFS + 1PC + 0.2TNA | 2 | 88 | 10 | |
| 8BFS + 2PC | | | | |
| 7.95BFS + 2PC + 0.05TNA | 0.5 | 79.5 | 20 | |
| 7.9BFS + 2PC + 0.1TNA | 1 | 79 | 20 | |
| 7.8BFS + 2PC + 0.2TNA | 2 | 78 | 20 | |
| 5BFS + 5PC | | | | |
| 4.95BFS + 5PC + 0.05TNA | 0.5 | 49.5 | 50 | |
| 4.9BFS + 5PC + 0.1TNA | 1 | 49 | 50 | |
| 4.8BFS + 5PC + 0.2TNA | 2 | 48 | 50 | |

TABLE 6

| | Time [Hours] | | | | | | | |
|---|---|---|---|---|---|---|---|---|
| Mixture | 0.5 | 1 | 2 | 4 | 6 | 24 | 48 | 72 |
| BFS | − | − | − | − | − | − | − | − |
| 9.95BFS + 0.05NA | − | − | − | − | − | − | − | − |
| 9.95BFS + 0.05TNA | + | + | ++ | ++ | ++ | +++ | +++ | +++ |
| 9.9BFS + 0.1TNA | + | + | + | + | + | ++ | +++ | +++ |
| 9.8BFS + 0.2TNA | + | + | + | + | + | + | ++ | +++ |
| PC | − | − | − | + | ++ | +++ | +++ | +++ |
| 9.95PC + 0.05NA | − | − | +/− | + | ++ | +++ | +++ | +++ |
| 9.9PC + 0.1NA | − | − | + | ++ | ++ | +++ | +++ | +++ |
| 9.8PC + 0.2NA | − | − | − | − | +/− | ++ | +++ | +++ |

TABLE 6-continued

| Mixture | Time [Hours] | | | | | | | |
|---|---|---|---|---|---|---|---|---|
| | 0.5 | 1 | 2 | 4 | 6 | 24 | 48 | 72 |
| 9.5PC + 0.5TNA | + | ++ | ++ | +++ | +++ | +++ | +++ | +++ |
| 9BFS + 1PC | − | − | − | + | + | ++ | +++ | +++ |
| 8.95BFS + 1PC + 0.05TNA | − | + | + | ++ | ++ | +++ | +++ | +++ |
| 8.9 BFS + 1PC + 0.1TNA | + | + | ++ | ++ | ++ | +++ | +++ | +++ |
| 8.8 BFS + 1PC + 0.2TNA | + | + | + | + | + | ++ | +++ | +++ |
| 8BFS + 2PC | − | − | − | + | + | ++ | +++ | +++ |
| 7.95BFS + 2PC + 0.05TNA | − | + | ++ | ++ | ++ | +++ | +++ | +++ |
| 7.9 BFS + 2PC + 0.1TNA | + | + | ++ | ++ | ++ | +++ | +++ | +++ |
| 7.8 BFS + 2PC + 0.2TNA | + | ++ | ++ | +++ | +++ | +++ | +++ | +++ |
| 5BFS + 5PC | − | − | − | + | ++ | +++ | +++ | +++ |
| 4.95BFS + 5PC + 0.05TNA | − | + | + | ++ | ++ | +++ | +++ | +++ |
| 4.9 BFS + 5PC + 0.1TNA | + | + | ++ | ++ | +++ | +++ | +++ | +++ |
| 4.8 BFS + 5PC + 0.2TNA | + | + | +++ | +++ | +++ | +++ | +++ | +++ |

It was found that all samples that contained the additive had an earlier solidification and higher strength. Pastes that were produced with the additive according to the invention exhibited substantial solidification and subsequent hardening, in some cases within only 30 minutes to 6 hours.

FIGS. 1 to 3 show thermogravimetric measurements of hydrated mixtures of ternesite with metakaolin (FIG. 1), ternesite with $Al(OH)_3$ (FIG. 2) and ternesite with $NaAlO_2$ (FIG. 3). It is clear that different hydrate phases, for example, AFt, AFm and C-(A)-S—H, are formed. FIG. 4 shows x-ray diffractograms of binders of ternesite with $NaAlO_2$ and the phase development thereof over time. These provide clear evidence of advanced hydration and phase conversions.

The invention claimed is:

1. A method for accelerating the hardening of hydraulic or latent hydraulic binders, wherein ternesite and an aluminum component are added to the binder.

2. The method according to claim 1, wherein the aluminum component is selected from the group consisting of soluble alkali aluminates, earth alkali aluminates, aluminum salts, aluminum hydroxides, aluminum oxide hydroxides, artificial pozzolans, natural pozzolans, and combinations thereof.

3. The method according to claim 2, wherein $Na_2Al_2O_4$, $K_2Al_2O_4$, aluminum nitrate, aluminum carbonate, aluminum acetate, aluminum chloride, aluminum formate, aluminum sulfate, amorphous/reactive aluminum hydroxide and/or aluminum oxide hydroxide and/or metakaolin is used as the aluminum component.

4. The method according to claim 1, wherein the ternesite comprises a ternesite clinker containing 10 to 100% by weight $C_5S_2\$$, 0 to 90% by weight (α, β) $C_2S$, 0 to 30% by weight $C_4(A_xF_{(1-x)})_3\$$ with x ranging from 0.1 to 1 0 to 30% by weight $C_2(A_yF_{(1-y)})$ with y ranging from 0.2 to 0.8 0 to 20% by weight reactive aluminate, 0 to 25% by weight periclase (M) and 0 to 30% by weight secondary phases, referred to the entire quantity of clinker, wherein the proportions of the phases add up to 100%.

5. The method according to claim 4, wherein at least one x-ray amorphous phase/glass phase is present as a secondary phase, ranging from 1 to 10% by weight.

6. The method according to claim 1, wherein ternesite and aluminum component are mixed and added to the binder dry or as a solution or suspension.

7. The method according to claim 1, wherein ternesite and aluminum component are added to the binder separately, each dry or as a solution/suspension.

8. The method according to claim 1, wherein the binder is selected from the group consisting of portland cement, portland composite cement, blast furnace cement, pozzolan cement, multicomponent/composite cement, super sulphated cement, calcium-aluminate cement, calcium sulfoaluminate cement, geopolymer cement, ground granulated blast furnace slag and lime-rich fly ash.

9. The method according to claim 1, wherein in the binder, the total of ternesite and aluminum component in the binder comprises a part of 1 to 20% by weight, preferably 2 to 15% by weight.

10. The method according to claim 4, wherein the clinker comprises a ternesite clinker containing 20 to 90% by weight $C_5S_2\$$, 10 to 80% by weight (α, β) $C_2S$, 5 to 20% by weight $C_4(A_xF_{(1-x)})_3\$$ with x ranging from 0.8 to 0.95, 5 to 20% by weight $C_2(A_yF_{(10-y)})$ with y ranging from 0.4 to 0.6, 1 to 15% by weight reactive aluminate, 1 to 15% by weight periclase (M) and 3 to 20% by weight secondary phases, referred to the entire quantity of the clinker, wherein the proportions of the phases add up to 100%.

11. The method according to claim 4, wherein 2 to 8% by weight x-ray amorphous phase/glass phase is present.

12. The method according to claim 11, wherein 3 to 5% by weight x-ray amorphous phase/glass phase is present.

13. The method according to claim 9, wherein the total of ternesite and aluminum component comprises a part of 2 to 15% by weight in the binder.

14. The method according to claim 13, wherein the total of ternesite and aluminum component in the binder comprises a part of 5 to 10% by weight.

15. An early strength increasing additive for hydraulic or latent hydraulic binders containing a non-hydraulically reactive aluminum component comprising ternesite.

16. The additive according to claim 15, wherein the part of ternesite ranges from 10 to 99% by weight and the percentage of the aluminum component ranges from 1 to 90% by weight.

17. The additive according to claim 15, wherein it contains additional setting and/or hardening accelerators.

18. The additive according to claim 15, wherein it contains plasticizers and/or water reducing admixtures.

19. The additive according to claim 16, wherein the part of ternesite ranges from 20 to 95% by weight, and the percentage of the aluminum component ranges from 5 to 80% by weight.

20. The additive according to claim 19, wherein the part of ternesite ranges from 40 to 90% by weight, and the percentage of the aluminum component ranges from 10 to 60% by weight.

21. The additive according to claim 17, wherein the setting and/or hardening accelerator is selected from the group consisting of lithium salts and other alkali salts.

22. The additive according to claim 21, wherein the lithium salt is lithium hydroxide and the alkali salt is an alkali hydroxide or an alkali silicate.

23. The additive according to claim 18, wherein the plasticisers and/or water reducing admixtures are based on lignin sulfonates, sulfonated naphthalene, melamine, or phenol-formaldehyde condensate, or based on acrylic acid acrylamide mixtures or polycarboxylate ethers, or based on phosphated polycondensates, phosphated alkylcarboxylic acids and salts thereof, (hydroxy)carboxylic acids and carboxylates, borax, boric acid and borates, oxalates, sulfanilic acid, aminocarboxylic acids, salicylic acid and acetylsalicylic acid, and dialdehydes.

* * * * *